Figure 1:
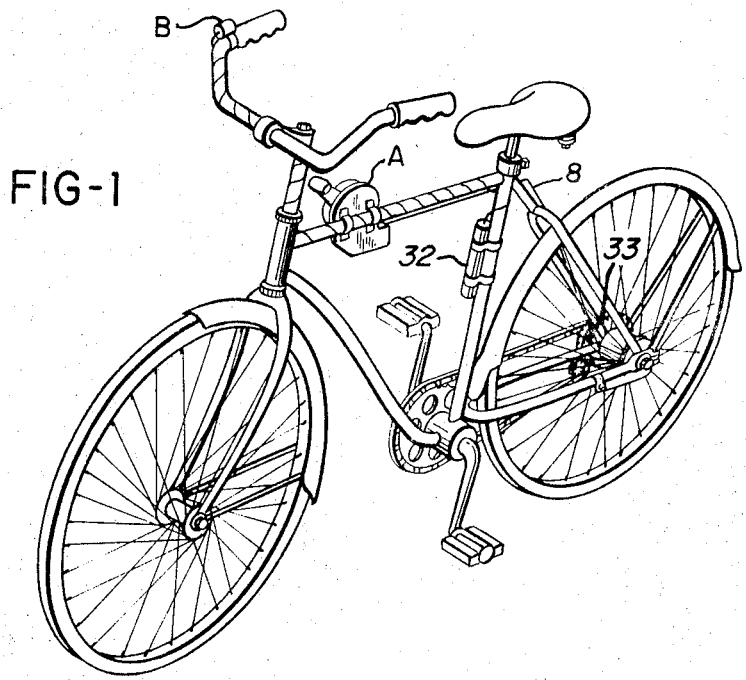

United States Patent [19]
Yamaguchi

[11] 3,732,787
[45] May 15, 1973

[54] BICYCLE SPEED CHANGE GEAR SHIFTING DEVICE

[75] Inventor: Eikichi Yamaguchi, Tokyo, Japan

[73] Assignee: Maruishi Cycle Industries Ltd., Tokyo, Japan

[22] Filed: Mar. 16, 1971

[21] Appl. No.: 124,715

[52] U.S. Cl.................192/142 R, 74/625, 280/236, 318/467
[51] Int. Cl..........................F16d 71/00, B62m 9/04
[58] Field of Search......................192/142 R, 142 A; 74/625, 626; 280/236, 237, 238; 318/467

[56] References Cited

UNITED STATES PATENTS

| | | | |
|---|---|---|---|
| 2,398,519 | 4/1946 | Clark | 192/142 A |
| 2,621,540 | 12/1952 | Rath | 74/626 |
| 2,621,544 | 12/1952 | Rossmann | 74/626 |
| 3,363,480 | 1/1968 | Murphy | 74/626 |
| 3,364,782 | 1/1968 | Freeland | 280/236 X |

Primary Examiner—Allan D. Herrmann
Attorney—Walter Becker

[57] ABSTRACT

A bicycle change gear transmission according to which one end of a shift lever is secured to a winding drum to which one end of an inner wire connected to the change gear transmission is secured while a clutch drum is secured to the other end of said shift lever, and a rotary gear is interlocked with a motor through the intervention of a transmission gear train. Furthermore, a clutch spring has one end secured to the inner side face of said rotary gear and wound around the clutch drum, a control switch mechanism being mounted adjacent one handle of the bicycle handle bar while a spacer is located contiguously with said rotary gear and has a control plate provided with a set of contact pieces respectively having corresponding slots and projections and connected to said control switch mechanism through separate circuits, two operating switches being provided in said control switch mechanism and connected respectively to a driving circuit and a braking circuit so that the shift lever may be automatically displaced to its predetermined positions by operating said switches selectively.

1 Claim, 8 Drawing Figures

PATENTED MAY 15 1973

3,732,787

SHEET 1 OF 3

INVENTOR
Eikichi Yamaguchi

By [signature]

INVENTOR
Eikichi Yamaguchi

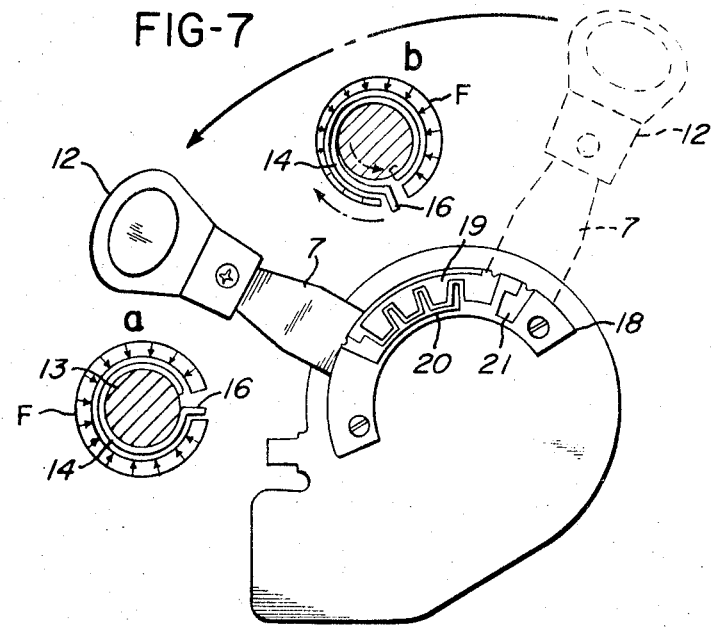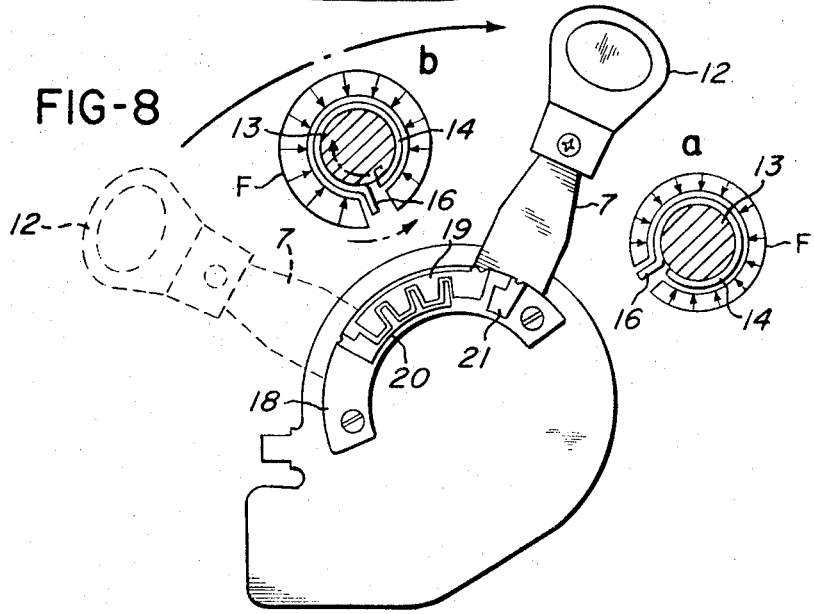

BICYCLE SPEED CHANGE GEAR SHIFTING DEVICE

This invention relates to a bicycle speed change gear shifting device.

In such a bicycle speed changing mechanism mounted to a wheel hub, the gear in the mechanism should be properly shifted corresponding to a running speed by means of a shift lever, otherwise, there would cause resistance in transmission of a drive power from a crank to a transmission chain to provide a proper pedalling during a cycling or biking.

Heretofore, such a bicycle speed change gear has usually been shifted by manipulating a shift lever mounted to the frame or the handle of the bicycle, thus it has been necessary to manipulate the shift lever by one hand while holding the handle by the other hand when the speed change gear is to be shifted, that is not only inconvenient in driving but also dangerous for the rider.

The primary object of the present invention is to provide an improved bicycle speed change gear shifting device which is operarable by hand while holding the handle.

Another object of the present invention is to provide an improved bicycle speed change gear shifting device which is capable of electrically controlling the operation of a shift lever.

It is a further object of the present invention to provide a bicycle speed change gear shifting device which is extremely simple to operate and insures a proper gear shifting.

According to the present invention, there is provided a bicycle speed change gear shifting device comprising a shift lever secured at one side to a winding drum to which one end of an inner wire connected to the speed change gear is secured, a clutch drum secured integrally to the other side of said shift lever, a rotary gear loosely fitted to the free end of the clutch drum, said rotary gear being interlocked with a motor through a transmission gear train, a clutch spring secured at its one end to the inner side face of said rotary gear and wound round the clutch drum, a control switch mechanism mounted adjacent one grip of the bicycle handle, a spacer having a control plate provided with a set of contact pieces respectively having corresponding slots and projections and connected to said control switch mechanism through separate circuits, said spacer being located contiguous to said rotary gear, a brush mounted relative to said shift lever in such a position as to be contacted with said contact pieces, and two operating switches provided in said control switch mechanism and connected respectively to a driving circuit and a braking circuit so that the shift lever may be automatically displaced to its predetermined positions by operating said switches selectively.

Figure 2:
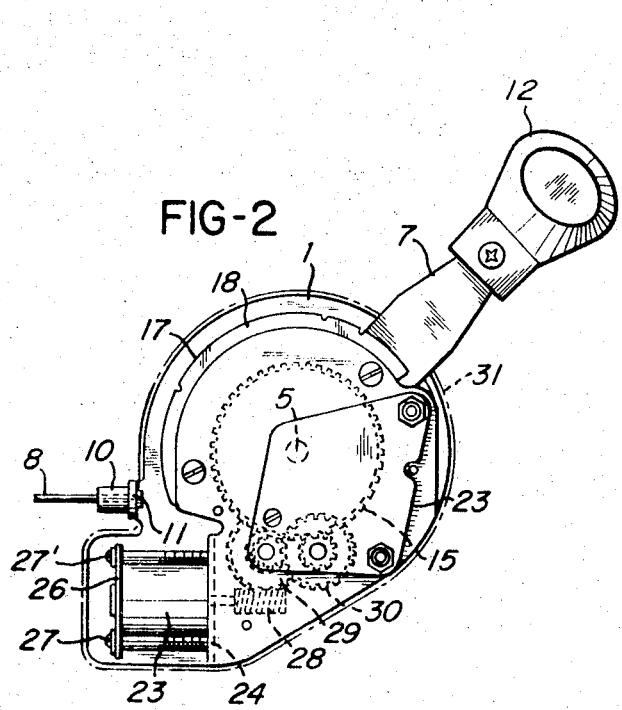
Figure 3:
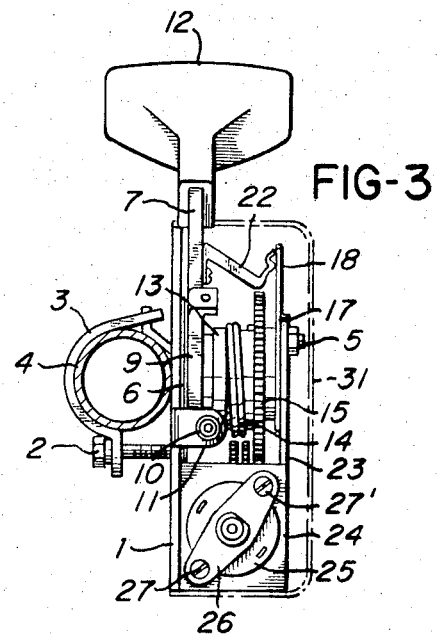
Figure 4:
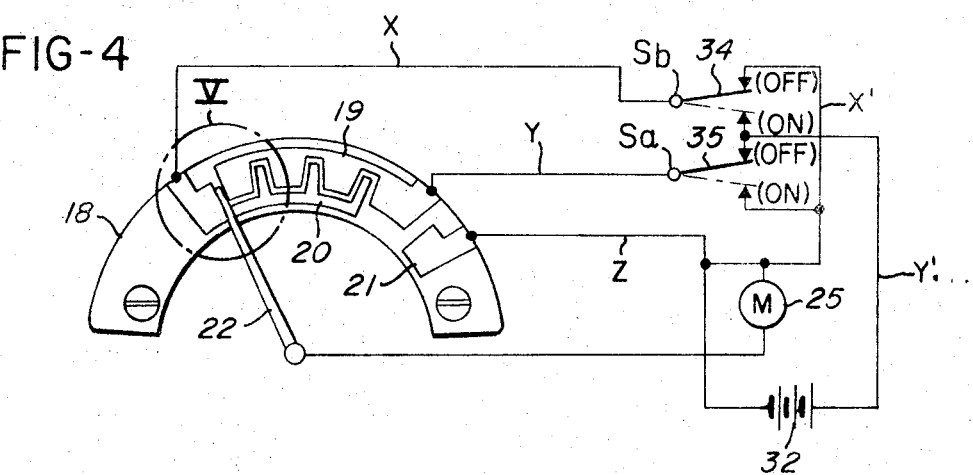
Figure 5:
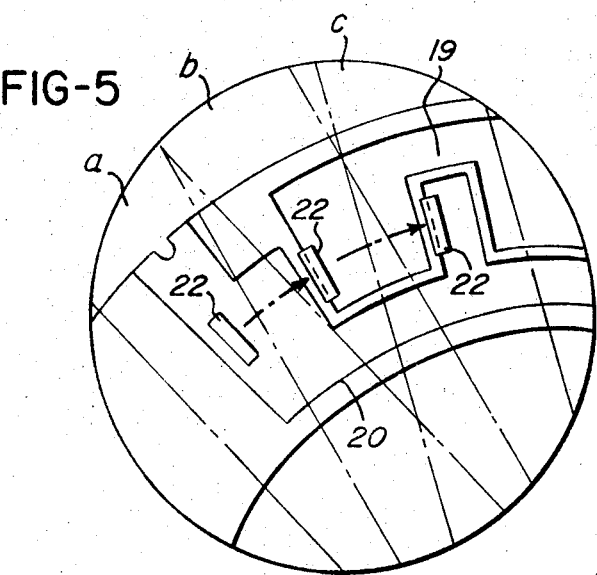
Figure 6:
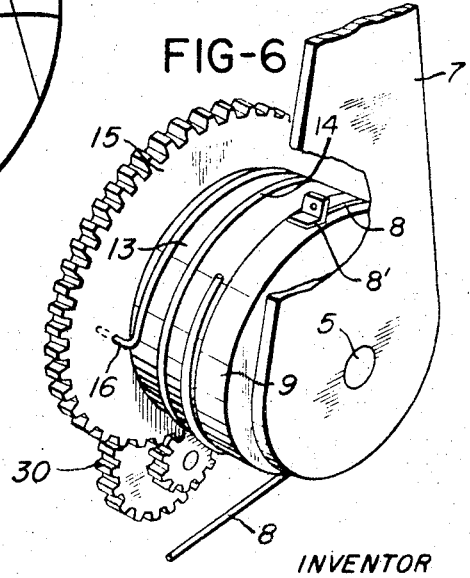

Now a preferred embodiment of the present invention will be described in detail with reference to the accompanying drawings, wherein FIG. 1 is a perspective view of a bicycle associated with the speed change gear shifting device of the present invention, FIG. 2 is a front view of a gear shifting mechanism which is a component of the present invention, FIG. 3 is a side view of the gear shifting mechanism shown in FIG. 2, FIG. 4 is a circuit diagram showing an electric circuit in the device of the present invention, FIG. 5 is an enlarged view of a portion encircled by a circle V in FIG. 4, FIG. 6 is a perspective view in an enlarged scale of an essential part of the shift lever in the device of the present invention, and FIGS. 7 and 8 are front views showing the operating conditions of the speed change gear shifting device, the condition during the acceleration being shown in FIG. 7 while the condition during the deceleration being shown in FIG. 8.

As shown in FIG. 1, the present invention essentially consisting of a gear shifting lever mechanism A mounted to a suitable portion such as the frame of the bicycle and a control switch mechanism B, mounted adjacent one grip of the handle and electrically connected to the mechanism A.

The gear shifting lever mechanism A is mounted relative to a frame portion or pipe 4 by band members 3 and clamp bolts 2 to be threaded to corresponding tapped holes provided in a base 1 of the mechanism A, in which a shift lever 7 is movably mounted through a spacer 6 to a main shaft 5 disposed substantially normal to the base 1.

Referring particularly to FIG. 6, an inner wire 8 is wound round a a half of the periphery of a winding drum 9 of the shift lever 7 and one end of the wire 8 is secured to the top portion of the winding drum 9 by suitable means such as, for example, a fitting member 8'. As shown in FIG. 3, the base has a portion inwardly extended to provide a lip 11 to which a fitting member 10 of the wire 8 is secured.

The shift lever 7 has a handle 12 mounted to the top end of the lever 7, and a clutch drum 13 is loosely fitted to the main shaft 5. The clutch drum 13 may be formed integrally with the shift lever 7 so as to be a unit, if so desired. As shown in FIG. 6, a clutch spring 14 is coiled round the clutch drum 13 and one end of the spring 14 is anchored to the drum 13. A first gear 15 is loosely fitted to the end of the clutch drum 13 and one end of the clutch spring 14 is engaged with a receiving hole provided in the side face of the gear 15 so as the gear to be interlocked with the drum.

Conditions a and b in FIGS. 7 and 8 respectively show the interrelationship between various elements including the shift lever 7, the clutch drum 13, the clutch spring 14 and the first gear 15. In the condition a as shown in FIGS. 7 and 8, the shift lever is in its stop position and the clutch drum 13 is locked in position by a suitable frictional force produced by the action of the spring 14 coiled round the drum 13, thus the shift lever integrally secured to or formed with the drum is also stopped at the stop position and maintained in the condition a. As the shift lever 7 in condition a is pulled as shown by dotted arrow in FIG. 7 (i.e., to shift the speed change gear from deceleration to acceleration), condition b as shown in FIG. 7 is attained. In other words, the clutch drum 13 and its spring 14 are turned to the direction shown by the dotted arrow that causes the spring to be loosened to reduce the frictional force so that the displacement of the shift lever 7 is readily accomplished. Condition b shown in FIG. 8 shows the reverse displacement of the shift lever 7 to shift the gear from the accelerating state to the decelerating state opposite to the case described referring to FIG. 7, thus the clutch drum 13 and its spring 14 are turned rightward as shown by dotted arrow to cause the spring tightening to increase the frictional force so that the spring 14 serves as a friction disc. In the conditions a and b shown in FIGS. 7 and 8, capital letter F represents a variable frictional force produced between the clutch drum and its spring.

Referring again to FIG. 3, a spacer 17 is fitted to the main shaft 5 and abutted to the first gear 15. The spacer 17 is provided with a projection formed on a side thereof facing the first gear and an arcuate control plate 18 having a printed circuit is integrally mounted relative to the upper peripheral portion of the spacer. As shown in FIG. 4, a set of contact pieces 19, 20 respectively having corresponding slots and projections and a brake contact piece 21 for actuating a brake are mounted relative to the control plate 18. Numeral 22 designates a brush adapted to be normally contacted with the contact pieces 19, 20 and secured to the shift lever by a screw. Numeral 23 designates a bearing plate contiguous to the spacer 17, the bearing plate 23 is formed with a lower support plate 24 on which a motor 25 is mounted by means of a mounting plate 26 and bolts 27, 27'. A worm 28 is secured to the motor shaft and the rotation of the motor 25 is transmitted through the worm 28, a third gear 29 meshed with the worm, and a second gear 30 meshed with the third gear to the first gear 15. Chain line 31 shown in FIG. 3 represents a case fitable to the base 1. In FIG. 1, numeral 32 designates a cell or battery attached to the frame by any suitable means, while numeral 33 indicates a change gear mechanism provided in the rear wheel hub, to which the other end of the inner wire 8 is connected.

As shown in FIG. 4, the control switch mechanism B comprises switches Sa and Sb which are arranged to be interlocked so that when switch Sa is operated to its ON position, switch Sb is also moved to its ON position. FIG. 4 is a circuit diagram showing the interrelationship between the gear shifting lever and control switch mechanisms A, B and a power source such as the battery 32, the contact piece 20 being connected to a terminal of the switch Sb through line X, while a movable arm 34 of the switch being connected to a brake of the motor 25 through line X' and normally contacted with OFF contact of the switch Sb to provide a braking circuit. On the other hand, the contact piece 19 is connected to a terminal of the switch Sa through line Y while the movable arm 35 of the switch is connected to the power source 32 through line Y' and normally contacted with OFF contact of the switch Sa to provide a driving circuit. As shown in FIG. 4, ON contact of the switch Sb and OFF contact of the switch Sa are formed in common. The contact piece 21 is connected to the brake of the motor through line Z and also connected to ON contact of the switch Sa.

According to the present invention, since the switches Sa, Sb are normally held in their OFF states, line X forms the braking circuit while line Y forms the driving circuit as set forth hereinbefore. It is obvious, therefore, that the contact piece 20 connected to line X serves as a braking contact whereas the contact piece 19 connected to line Y serves as a driving contact. Accordingly, when the brush 22 mounted relative to the shift lever 7 is in contact with any portions of the contact piece 19, the motor 25 is rotated and when the brush is in contact either with the contact piece 20 or the brake contact piece, the motor naturally remains stationary.

The gear shifting operation relative to the change gear mechanism 33 provided in the rear wheel hub to accelerate the running speed of the vehicle may be accomplished by simply displacing the shift lever handle 12 from a position shown by dotted line to a position shown by solid line in FIG. 7. In other words, when the shift lever 7 is held in a predetermined position, i.e., in condition a, the clutch drum 13 is locked by a suitable frictional force produced by the action of the spring 14 wound round the drum, thus the shift lever 7 which is an integral part of the drum is also maintained in the same position in this condition a. However, when the shift lever 7 is displaced to its acceleration position, since the end 16 of the spring 14 is connected to the first gear 15 loosely fitted to the drum, a force in direction indicated by a small dotted arrow acts on the drum and its spring in condition b shown in FIG. 7. Consequently the spring is loosened to reduce the frictional force so that the shift lever 7 which is integral with the drum may be readily displaced.

FIG. 8 shows a grear shifting in the manner opposite to that shown and described in connection with FIG. 7, i.e., a gear shifting for deceleration, which is carried out through the control switch mechanism B mounted in a position ready to hand, for example, near a handle grip as shown. Assuming that the shift lever 7 is in the high gear position and that it is desired to be shifted to the second gear position, this is done by first pushing the switch Sa to make it ON whereby the switch Sb is also made ON by interlocking motion simultaneously. At such a time, since the movable arm 34 of the switch Sb is moved from the OFF contact in the braking circuit X to the ON contact in the driving circuit Y' (i.e., the OFF contact of the switch Sa) to break the braking circuit X and to make the driving circuit Y' including the contact piece 20 on the control plate as its driving contact. On the other hand, the movable arm 35 of the switch Sa is moved out of the OFF contact to discontinue line Y of the driving circuit and is engaged with the ON contact to complete a braking circuit which includes the contact piece 19 as its braking contact. As the motor 25 is actuated, its rotation is transmitted to the first gear 15 through worm 28, third gear 29 and second gear 30. The rotation of the first gear 15 causes to rotate the clutch drum 13 in the same direction through the spring 14, thus to move the shift lever 7 integrally secured to the drum 13. Thus, when the switch Sa is pushed to make both switches Sa, Sb ON state, the shift lever 7 is moved from position a to position b shown in FIG. 5. Whereupon, as the switch Sa is released, the switches Sa, Sb return to their OFF position and their movable arms 34, 35 are respectively engaged with their corresponding OFF contacts, therefore, the shift lever 7 is further moved from position b to position c in which it is stopped. It is to be noted that the shift lever 7 is always stopped within the range of the contact piece 20 and this is also true in case of gear shifting for acceleration. Therefore, during the acceleration, even if the hand is off from the lever handle 12 within the range of the contact piece 19, the motor 25 will be immediately started to rotate to cause the shift lever advanced to the adjacent portion of the contact piece 20 then to return it in decelerating direction to some degree to stop it. In this instance, the clutch drum 13 with the coil spring 14 only acts as a frictional disk and does not prevent operation of the lever 12. In this manner, during the deceleration, one step deceleration is accomplished by pushing the switch S$a$ once, therefore, when three-step deceleration is desired, this can be done by merely pushing the switch S$a$ three times successively.

Now an emergency or rapid deceleration will be described instead of the stepwise deceleration as set forth hereinabove. The rapid deceleration can be attained merely by pushing the switch S$b$ continuously so that the movable arm 34 of the switch S$b$ is moved out of OFF contact to break the braking circuit X to release the brake. As the movable arm 34 is separated from the OFF contact, it engages with ON contact connected to the driving circuit Y' thus to include therein the contact piece 20 as its driving contact. On the other hand, the other contact piece 19 maintains its state at this time as a driving contact since it still remains unconnected to the driving circuit Y' through the movable arm 35 of the switch S$a$. Accordingly, both of the contact pieces 19, 20 serve as the driving contacts, thus the shift lever 7 connected to these contacts through the brush 22 is rapidly moved to its deceleration position and stopped on the braking contact piece 21.

The preferred embodiment of the present invention has been illustrated and described as a five-speed change gear shifting device, however, it is not limited thereto but it is to be understood that the shifting steps may be varied to any desired numbers, with changing the configuration of the contact pieces 19, 20 suitably relative to the desired number of the shifting steps. In addition, according to the present invention, the gear shifting for deceleration is carried out through the switch control mechanism B positioned near the handle grip whereby to move the shift lever to a desired position as set forth hereinbefore, however, the shift lever may also be operated by hand.

What I claim is:

1. A bicycle speed change gear shifting device comprising: a bicycle handle having at least one grip therewith, a change gear mechanism, a shift lever secured at one side to a winding drum to which one end of an inner wire connected to the change gear mechanism is secured, a clutch drum secured integrally to the other side of said shift lever, a rotary gear loosely fitted to the free end of the clutch drum, said rotary gear being interlocked with a motor through a transmission gear train, a clutch spring secured at its one end to the inner side face of the rotary gear and wound round the clutch drum, a control switch mechanism mounted adjacent one grip of the bicycle handle, a spacer having a control plate provided with a set of contact pieces respectively having corresponding slots and projections and connected to said control switch mechanism through separate circuits, said spacer being located contiguous to said rotary gear, a brush mounted to said shift lever in such a position as to be contacted with said contact pieces, and two operating switches provided in said control switch mechanism and connected respectively to a driving circuit and a braking circuit so that the shift lever may be automatically displaced to its predetermined positions by operating said switches selectively.

* * * * *